US006772348B1

(12) United States Patent
Ye

(10) Patent No.: US 6,772,348 B1
(45) Date of Patent: Aug. 3, 2004

(54) METHOD AND SYSTEM FOR RETRIEVING SECURITY INFORMATION FOR SECURED TRANSMISSION OF NETWORK COMMUNICATION STREAMS

(75) Inventor: Chun Ye, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/560,038

(22) Filed: Apr. 27, 2000

(51) Int. Cl.[7] .......................... G06F 11/30; G06F 12/14; H04L 9/32
(52) U.S. Cl. ....................... 713/201; 713/200; 713/160; 713/162
(58) Field of Search ................................ 713/160, 201, 713/200

(56) References Cited

U.S. PATENT DOCUMENTS 5,530,703 A  * 6/1996  Liu et al. .................... 370/255
6,147,976 A  * 11/2000 Shand et al. ................ 370/254
6,253,321 B1 * 6/2001  Nikander et al. ........... 713/160

OTHER PUBLICATIONS

Chiueh, T., Ballman, A. "Performance optimization of Internet firewalls", Proceedings of the SPIE– The International Society for Optical Engineering Conference, vol. 2915, 1997, pp. 168–173.

Kent, S., Atkinson, R., "Security Architecture for the Internet Protocol", RFC: 2401, Nov. 1998, Available at http://www.ietf.org/rfc/rfc2401.txt, [Accessed on Mar. 23, 2001].
Harkins, D., Carrel, D., "The Internet Key Exchange (IKE)", RFC: 2409, Nov. 1998, Available at http://www.ietf.org/rfc/rfc2409.txt, [Accessed on Mar. 23, 2001].
Piper, D., "The Internet IP Security Domain of Interpretation for ISAKMP", RFC: 2407, Nov. 1998, Available at http://www.ietf.org/rfc/rfc2407.txt, [Accessed on Mar. 23, 2001].

* cited by examiner

Primary Examiner—Gilberto Barron
Assistant Examiner—Joseph M McArdle
(74) Attorney, Agent, or Firm—Leydig, Voit & Mayer, Ltd.

(57) ABSTRACT

A system and method for retrieving security data, such as Security Associations ("SAs") of the IPSec protocols, required for secured transmission of network packets uses a caching mechanism to significantly enhance the speed of retrieving the security data. The system has a plurality of security policy filters, and each filter may have multiple security data entries associated with different communication streams. To enable fast retrieval of security data for network communication packets, the system maintains cache table. Each entry of the cache table contains data identifying a communication stream and negotiated SA data or an exempt filter for that stream. When a packet passes through the system, a security driver derives an index value from the communication stream data of the packet, and the cache table entry corresponding to the derived index value is then retrieved. If the retrieved security data in the cache table entry matches the packet, the security data therein are used for secured delivery of the packet.

20 Claims, 6 Drawing Sheets

METHOD AND SYSTEM FOR RETRIEVING SECURITY INFORMATION FOR SECURED TRANSMISSION OF NETWORK COMMUNICATION STREAMS

TECHNICAL FIELD OF THE INVENTION

This invention relates generally to network communications, and more particularly to security measures for protecting network communications.

BACKGROUND OF THE INVENTION

The Internet has entered the new millenium as the most important computer network of the world. Everyday, millions of people use the Internet to communicate with each other and to gather or share information. Moreover, electronic commerce ("E-commerce") using the WorldWide Web (WWW) of the Internet as its backbone is rapidly replacing and changing the traditional way of commerce based on conventional brick-and-mortar stores.

The security of communications over the Internet, however, has always been a major concern. This problem is related to the underlying network communication protocol of the Internet, the Internet Protocol ("IP"), which is responsible for delivering packets across the Internet to their destinations. The Internet Protocol was not designed to provide security features at its level of network communication operation. Moreover, the flexibility of IP allows for some creative uses of the protocol that defeat traffic auditing, access control, and many other security measures. IP-based network data is therefore wide open to tampering and eavesdropping. As a result, substantial risks are involved in sending sensitive information across the Internet.

To address the lack of security measures of the Internet Protocol, a set of extensions called Internet Protocol Security ("IPSec") Suite has been developed to add security services at the IP level. The IPSec Suite includes protocols for an authentication header (AH), encapsulating security protocol (ESP), and a key management and exchange payload (IKE). A significant advantage of the IPSec Suite is that it provides a universal way to secure all IP-based network communications for all applications and users in a transparent way. Moreover, as the IPSec Suite is designed to work with existing and future IP standards, regular IP networks can still be used to carry communication data between the sender and recipient. The IPSec Suite is also scalable and can therefore be used in networks ranging from local-area networks (LANs) to global networks such as the Internet.

Performing network communication security operations under the IPSec protocols, however, does require extra overheads; one of them being the maintenance and retrieval of data needed for performing the security operations. Under the IPSec protocols, for each communication stream to be secured, a set of security parameters for the authentication and encryption operations for securely delivering packets of this particular communication stream has to be negotiated first. This set of security parameters, collectively called the Security Association ("SA") for the communication stream, then has to be stored in memory by an IPSec driver for use with subsequent packets of the communication stream.

Besides the SA data for different communication streams, the IPSec driver typically also maintains a plurality of filters for implementing security policies. Under each filter, there may be multiple SAs, each of which has been negotiated for a communication stream that matches the filter. Depending on the complexity of the security policies and how heavy the network traffic through the IPSec driver is, there may be many security policy filters and a large number of SAs associated with each filter.

For each IP packet passed to the IPSec driver, the IPSec driver has to determine whether the packet matches a policy filter. If a matching filter is found and the packet is to be secured under IPSec, the driver then has to locate the SA, if it exists, for the communication stream to which the packet belongs. This lookup operation for the matching filter and SA is performed on every packet passing through the driver. In a computer system with many filters and SAs, this lookup operation of finding matching filters and SAs can be very time consuming and can become the performance bottleneck for network communications secured under the IPSec protocols.

SUMMARY OF THE INVENTION

In view of the foregoing, the present invention provides a system and method for retrieving security data for secured transmission of network packets, such as Security Associations ("SAs") of IPSec that uses a caching mechanism to significantly enhance the speed of retrieving the security. The caching mechanism uses a cache table with multiple entries. Each entry of the cache table stores data that identifies a communication stream and the security data or an exempt filter applicable to that communication stream. When a packet passes through the system, an index value is derived from the communication stream data of the packet. The cache table entry corresponding to the derived index value is then retrieved and compared to the packet. If the retrieved cache table entry matches the packet and contains security data, the security data are used to secure the delivery of the packet.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
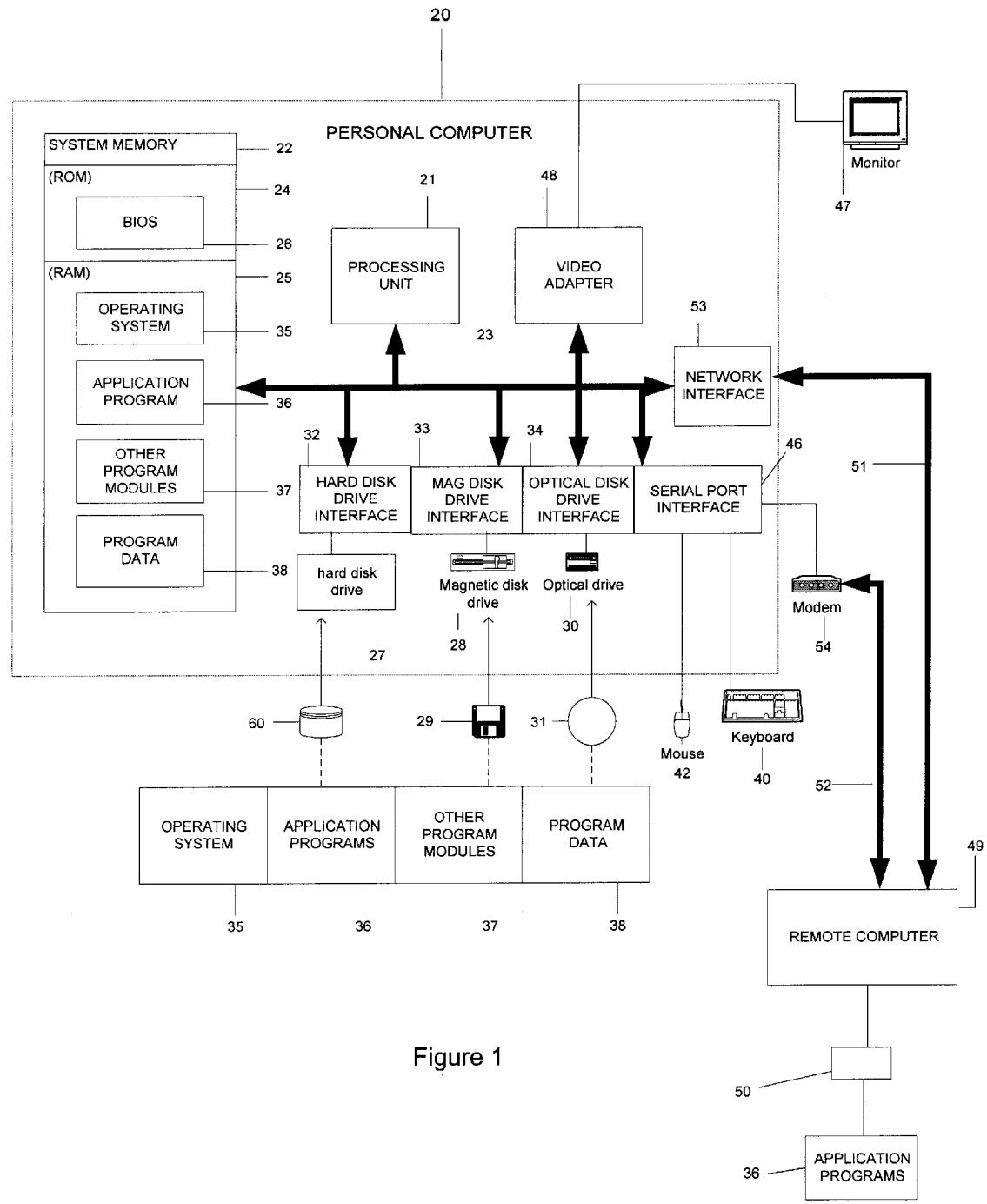
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
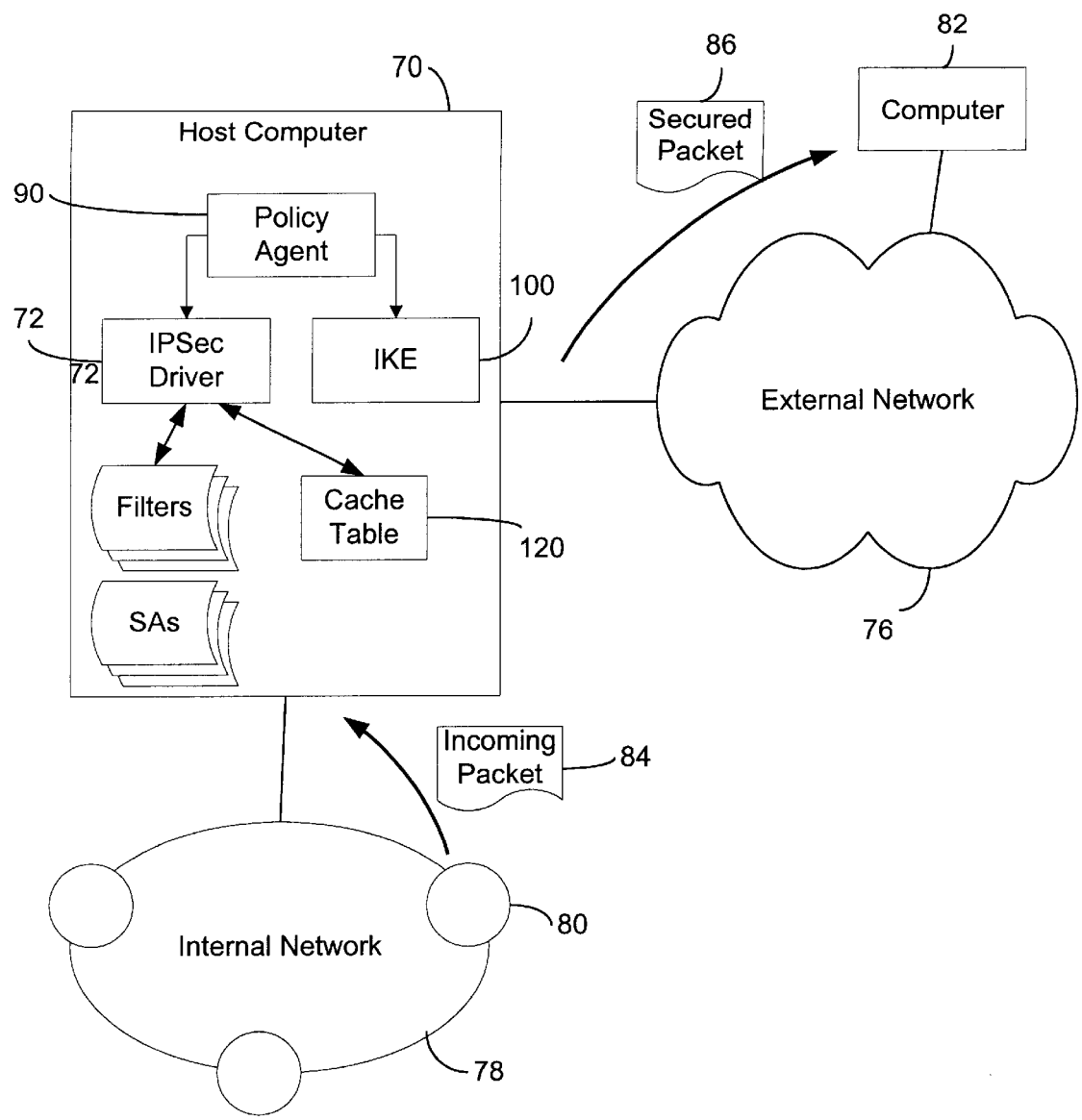
FIG. 2 is a schematic diagram showing a network system in which a computer maintains a cache table for rapid retrieval of security data for network communication streams passing through the computer.

Referring now to FIG. 2, the present invention is directed to a way for a security driver of a computer to quickly retrieve security data needed for secured delivery of packets of different communication streams passing through the computer. For illustration purposes, the invention will be described below in connection with a preferred embodiment that implements the IPSec Suite protocols for securing network communication streams. It will be appreciated, however, that the system and method of the invention can also be effectively used with other network security protocols that require retrieval of security data associated with a communication stream to deliver packets of that communication stream in a secured manner In the embodiment shown in FIG. 2, the security driver is an IPSec driver 72. The host computer 70 on which the IPSec driver resides is connected to an external network 76, such as the Internet, and communicates with other computers on the external network by sending and receiving packets based on the Internet Protocol. The host computer 70 may be a stand-alone computer, as is the case for most home computers. Alternatively, the host computer may also be part of an internal network 78 such as a local-area network ("LAN"), as in the embodiment shown in FIG. 2. In the illustrated embodiment, the host computer 70 functions as a firewall or gateway for computers on the internal network 78 to communicate with computers on the external network 76. For example, a computer 80 on the internal network may attempt to communicate with a computer 82 on the external network by transmitting communication packets. The packets 84 sent by the computer 80 are transmitted to the gateway computer 70. The IPSec driver 72 of the gateway computer then applies security policies and performs security services under the IPSec protocols to ensure secured delivery of the packets. In another scenario, the network communication packets may be generated by or destined to an application on the host computer on which the IPSec driver resides.

Figure 3:
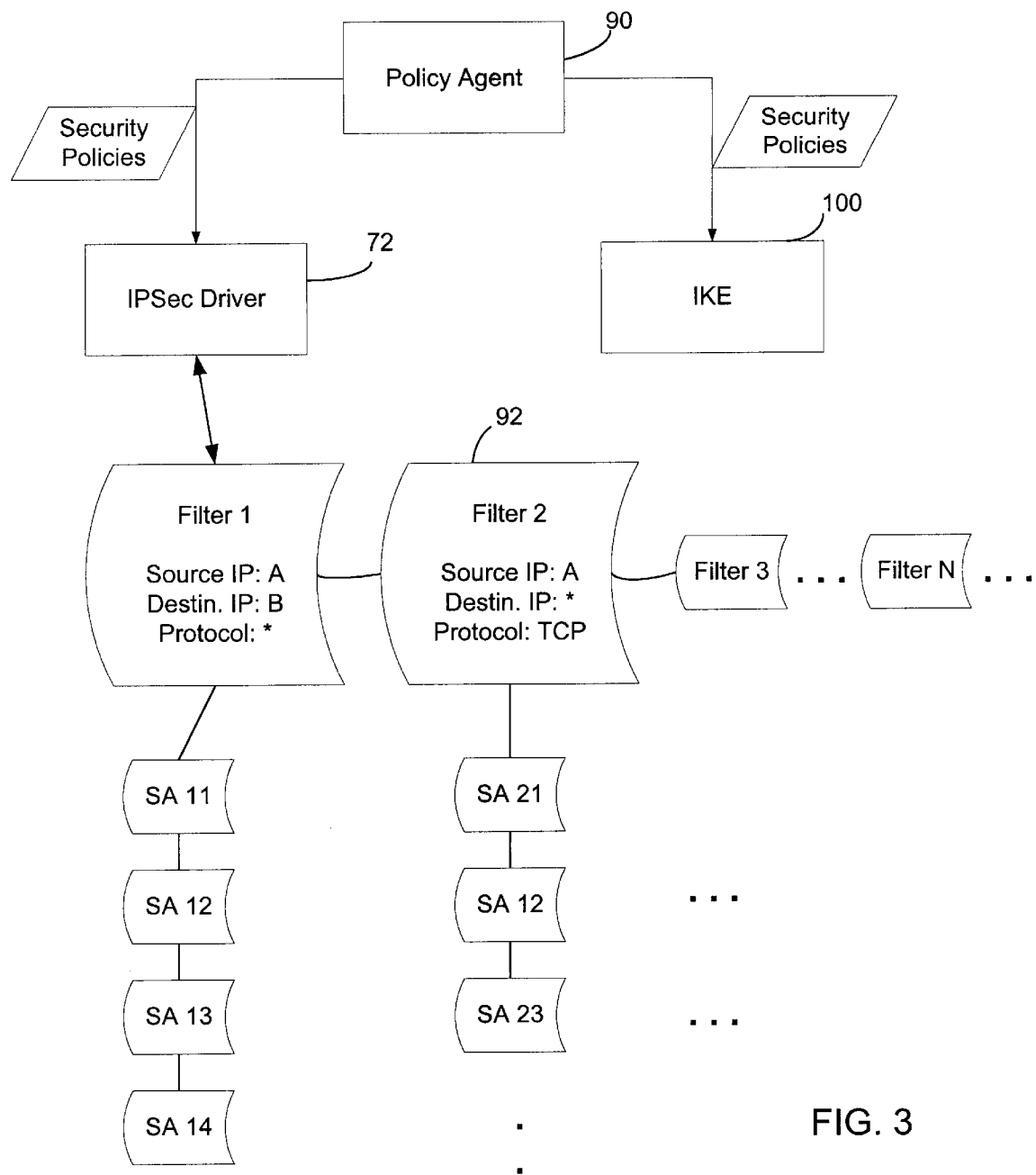
FIG. 3 is a schematic diagram showing security policy filters and Security Association ("SA") records maintained by an IPSec driver.

Turning now to FIG. 3, to enforce the security policies and perform IPSec security services for delivering packets, the IPSec driver maintains a plurality of filters and Security Association records. The filters are static and contain data specifying security policies assigned by a Policy Agent 90, which is an upper-layer IPSec component. Each filter includes data identifying the type of communication streams to which it is applicable. For example, a filter 92 may indicate that it applies to communication streams with the source IP address of computer A and any destination IP address (as indicated by "*") and with the transport protocol being the TCP.

For each of the filters maintained by the IPSec driver, there may be one or more Security Association ("SA") records associated therewith. Each Security Association record pertains to a given communication stream with a specific sender and a specific recipient and includes a collection of data for performing security operations on packets of that communication stream. For instance, the SA data may specify whether the Authentication Header ("AH") or Encryption Security Payload ("ESP") protocols of the IPSec Suite should be applied, what type of cryptographic algorithms should be used, and provide information regarding the keys used in the cryptographic algorithms. The Security Association record is established during the initial phase of the communication by an Internet Key Exchange ("IKE") component 100 with a peer IKE component on the receiving side.

For each packet passing through the IP layer of the host computer 70, the IPSec driver 72 has to determine whether the packet matches any security policy filter and, if so, to obtain the SA for the packet in order to perform security operations on the packet. For example, when a computer 80 on the internal network in FIG. 2 sends a communication packet 84 to a target recipient on the external network, that packet is passed through the gateway computer. When the IPSec driver 72 of the gateway computer sees the packet, it checks whether the data in the IP header and transport of the packet match those of any of the filters. If a matching filter is found, the IPSec driver determines whether there is a SA record associated with the matching filter that matches the packet. Finding a matching SA record means that the security parameters for the communication stream to which the packet belongs have already been established and stored in the SA record. The data in the matching SA record are then used to, among other things, convert the original packet 84 into an outgoing packet 86 that is typically encrypted and containing authentication data.

On the other hand, in the case of an initial communication packet for which the security parameters have been negotiated yet, no matching SA will be found. In that case, the IPSec driver 72 calls the IKE component 100 to negotiate the Security Association data for delivering the packet. If the negotiation is successful, the packet is delivered according to the negotiated SA data. The negotiated SA data are also stored in a SA record associated with the filter for use with subsequent packets in the same communication stream.

In the embodiment shown in FIG. 3, the filters are maintained as a linked list. The SA records associated with each filter are also organized as a linked list under that filter. The lookup operation performed for a packet involves first going through the list of filters until a matching filter is found. The SA records in the linked list under that filter is then compared one by one with the packet until a match with a packet is found. If there are many filters and a large number of SA records, this lookup process can be very time consuming.

Figure 4:
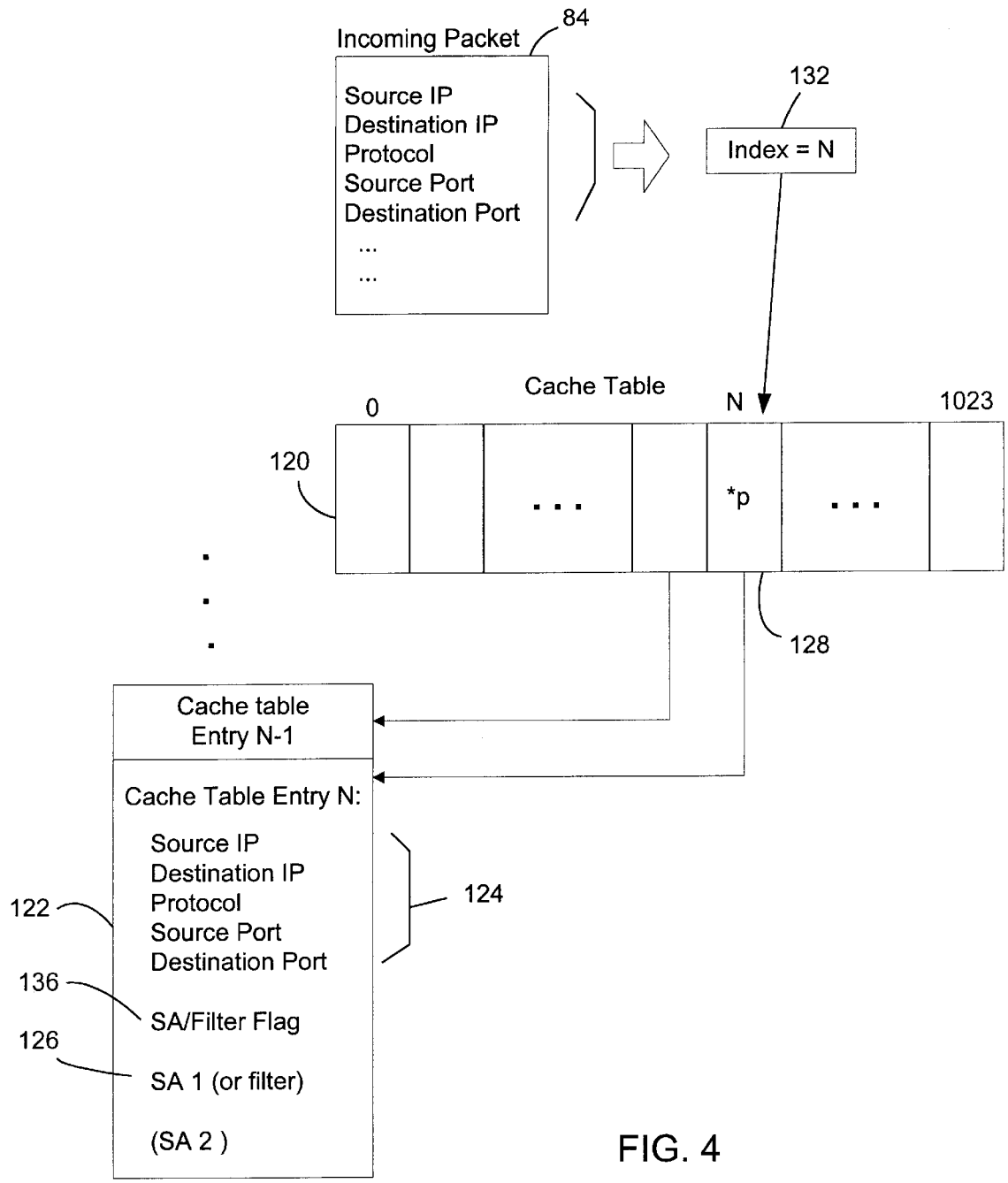
FIG. 4 is a schematic diagram showing the use of a cache table for retrieving security data associated with a communication packet.

In accordance with a feature of the invention, the process of finding matching security data for a packet is made potentially much faster by caching the security data for recently delivered packets. In a preferred embodiment, this caching mechanism is performed by means of a cache table. As shown in FIG. 4, the cache table 120 has a plurality of entries. Each cache table entry includes data identifying a communication stream. In the present embodiment, such communication stream data 124 of a cache table entry data record 122 includes the following elements: a source IP address, a destination IP address, the transport protocol (e.g., TCP) to be used for delivering packets in the associated communication stream, the source port from the transport layer, and the destination port from the transport layer. These elements identify the communication stream associated with the SA and are used to match the SA with a packet. The SA data 126 for the identified communication stream are also stored in the cache table entry data record 122. It will be appreciated that these data of a cache table entry may be directly stored in the memory space allocated for the table. Alternatively, as shown in FIG. 4, the cache table 120 may contain a pointer 128 that points to the memory space where the record 122 containing the communication stream data and SA data is stored.

When the IPSec driver 72 receives a packet 84, it derives an index value 132 from the communication stream data of the packet. The data of the cache table entry corresponding to the index value are then retrieved and compared to the packet to see whether they match. As mentioned above, in the illustrated embodiment, the communication stream data include the source IP address, the destination IP address, the transport protocol (e.g., TCP), the source port from the transport layer, and the destination port from the transport layer. This embodiment takes advantage of the fact that most applications communicate with the same communication stream, and these five elements of communication stream data are used for matching both the security policy filters and the SA records. Thus, if a matching SA record is found for a packet, the packet will also match the filter associated with the SA record and there is no need for a separate comparison with the filter.

In one implementation, the cache table 120 for caching SA data has a fixed size (e.g., 1024) which may be set by using the system registry of the host computer. The size of the cache table, i.e., the number of entries in the table, may be selected to provide an acceptably low cache-miss rate but not too large so as to result in inefficient usage of memory. Thus, the adequate size of the cache table would depend on the network traffic processed by the IPSec driver.

For a given packet 84, the index value 132 is generated by first combining the source and destination IP addresses, destination IP address, the protocol, and the source and destination ports into a number. The modulus of this combined number is then calculated and used as the index value. Since the size of the cache table 132 is typically smaller than the number generated by combining the parameters used as the input for the index calculation, it is possible for two different network communication streams to have the same cache index value. In other words, it is possible for a "collision" in terms of SA caching to occur between two different communication streams. As will be described in greater detail below, in the case of a collision, the cache table entry data will be updated to store the communication stream data and SA data for the more recent communication stream.

In accordance with a feature of the embodiment, a cache table entry may be used store a filter instead of a SA. This is because some of the filters maintained by the IPSec driver may be "exempt filters" of either the "bypass" type or the "block" type. A packet that matches a bypass filter is allowed to pass through without performing any IPSec security operations. In other words, a communication stream matching the bypass filter bypasses the IPSec security services. On the other hand, a packet that matches a block filter is simply dropped. A match with an exempt filter of either type is final, i.e., there is no need to find any matching SA record. Including exempt filters in the cache cable entries in effect caches the exempt filters. Because a cache table entry may be used to store either an exempt filter or a SA, a flag 136 is included in the cache table entry 122 to indicate whether a SA or an exempt filter is stored in the record.

Figure 5:
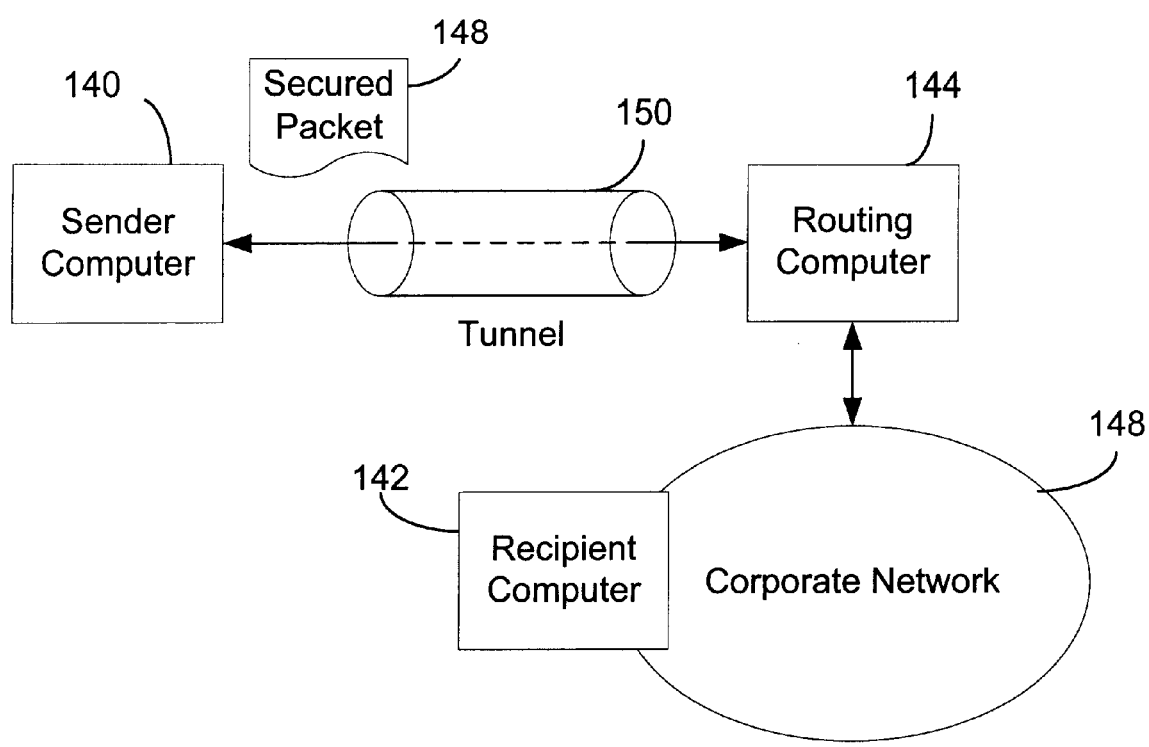
FIG. 5 is a schematic diagram showing an arrangement in which multiple SAs are used for secured delivery of a communication packet.

In accordance with another feature of the embodiment, the data of a cache table entry may include more than one SA. This occurs where more than one SA is required for the secured delivery of the associated communication stream. For example, this is the situation in the special case illustrated in FIG. 5. In this case, the communication stream from a sender computer 140 to a recipient computer 142 involves tunneling between the sender and a routing computer 144. In addition to the tunneling, the recipient computer 142, which is on an internal network 146 such as a corporate network, is set up such that it requires all communications with it to be transported under the security protection of IPSec. Thus, two different SAs are required for the communication stream from the sender 140 to the recipient 142, one for the tunneling between the sender and the routing computer 144 and the other for the transport between the sender and the recipient. In this case, the cache table entry associated with the communication stream would have two sets of SA data for securing the packets 148 to the recipient computer through the tunnel 150.

Figure 6:
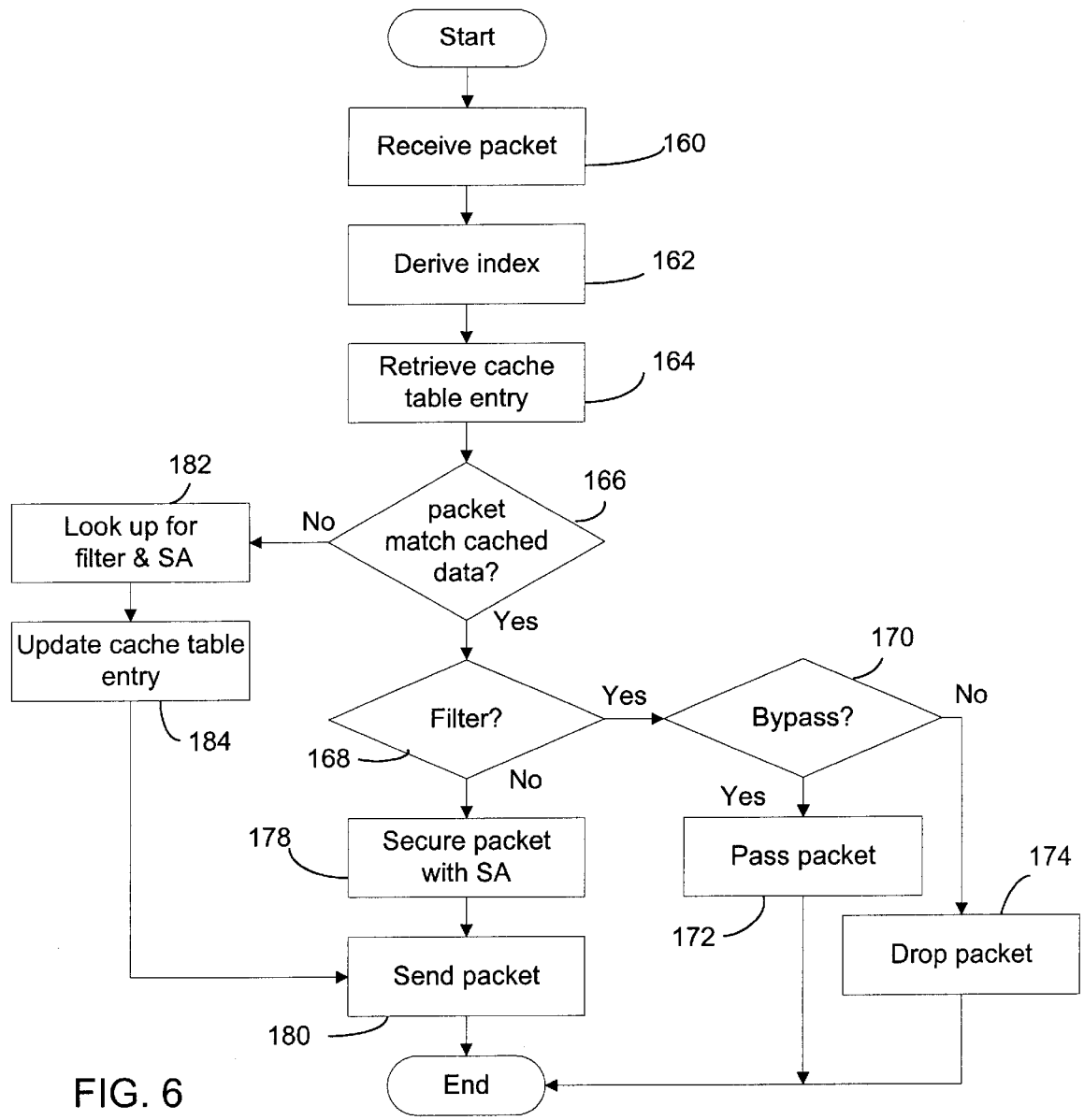
FIG. 6 is a flow diagram showing a process of retrieving security data for securing a communication packet using the cache table of FIG. 4.

The use of the cache table 120 for retrieving SA records for packets is now described in reference to FIG. 6. When a packet comes in (step 160), the IPSec driver 72 first checks whether the SA for the packet is already cached. To that end, the IPSec driver calculates an index value for the packet based on communication stream data of the packet (step 162). The cache table entry data corresponding to the index value are then retrieved (step 164). The IPSec driver then determines whether the retrieved cache table entry match the packet by comparing their communication stream data (step 166). If a match is found, the SA/filter flag is checked to determine whether the record stores a filter or a SA (step 168). This determination allows the IPSec driver to correctly interpret the data of the retrieved cache table entry. If the cache table entry stores a filter and the filter is a bypass filter (step 170), the IPSec driver simply lets the packet pass through without performing IPSec security operations (step 172). If the cache table entry stores a filter and the filter is a block filter, the packet is dropped (step 174). If the cache table entry stores SA data, security operations such as authentication and encryption are performed in accordance with the SA data (step 178), and the packet is sent out (step 180).

On the other hand, the retrieved cache table entry may not match the packet (step 166). This situation may occur if there is no matching filter for the packet, if the packet is an initial packet of the communication stream so that no SA has been negotiated, or if there is a collision in caching between two communication streams. When a mismatch between the retrieved cache table entry and the packet is found, a lookup operation through the various filters and their respective SA records are performed (step 182). The cache table entry corresponding to the index value of the packet is then updated (step 184) so that it can be used for the subsequent packets in that communication stream.

In the illustrated embodiment of FIG. 3, the IPSec driver first goes through the linked list of filters to see whether any filter matches the packet. If no matching filter is found, the packet does not meet any security policy and is therefore bypassed. If, however, a matching filter is found, the IPSec driver determines whether the filter is an exempt filter. For an exempt filter, the packet is either dropped or allowed to pass depending on whether the filter is a block or bypass filter. The cache record corresponding to the index value of the packet is also updated to contain the matching exempt filter.

If the matching filter is not an exempt filter, the IPSec goes through the linked list of the SA records under the filter to see whether a matching SA record can be found. If a matching SA record is found, the SA data in the record are retrieved for delivering the packet under IPSec. Note that this scenario of cache-miss with an existing matching SA is caused by a cache collision between the present communication stream and another communication stream, i.e., two different communication streams are mapped to the same cache record. The policy of updating the cache table entry with the data for the current packet ensures that the security data for an active communication stream are more likely to be found in the cached data. Of course, the possibility of collision can be reduced by increasing the size of the cache table.

If, however, no matching SA record is found, no SA data have been negotiated for the communication stream of the packet yet. In that case, the IPSec driver calls the IKE component to negotiate the SA for that communication stream. If the SA is successfully negotiated, it is used to deliver the packet. The cache entry corresponding to the index value of the packet is also updated to contain the communication stream data and the new SA.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing the steps comprising:
   receiving a communication packet having communication stream data identifying a communication stream to which the communication packet belongs;
   deriving an index from the communication stream data of the packet by combining the communication steam data into a number and calculating a modulus of said number based on a size of a cache table;
   retrieving from a cache table an entry corresponding to said index, the entry containing communication steam data and security data for said communication stream;
   comparing the communication stream data of the retrieved cache table entry with the communication stream data of the communication packet to determine whether a match between the cache table entry and the communication packet is found; and
   when a match is found, applying security measures to the communication packet according to the security data in the cache table entry.

2. A computer-readable medium as in claim 1, wherein the security data includes a Security Association ("SA") under the IPSec protocols.

3. A computer-readable medium as in claim 1, wherein the communication stream data of the communication packet include a source address and a destination address.

4. A computer-readable medium as in claim 3, wherein the communication stream data of the communication packet further include data specifying a transport protocol used for the communication packet.

5. A computer-readable medium as in claim 4, wherein the communication stream data of the communication packet further include data specifying a source transport port and a destination transport port.

6. A computer-readable medium as in claim 1, having further computer-executable instructions for performing the steps of:
   when a match between the cache table entry and the communication packet is not found, traversing a list of security policy filters to find a security policy filter matching the communication packet;
   reviewing a plurality of security parameter records associated with the matching security policy filter to identify a security parameter record matching the communication packet;
   performing security operations on the communication packet according to data in the matching security parameter record for secured delivery of the communication packet; and
   updating the cache table entry associated with the index with data in the matching security parameter record.

7. A computer-readable medium as in claim 6, having further computer-executable instructions for performing the steps of:
   when a matching security policy filter is found and a matching security parameter record is not found, calling a negotiation server to negotiate security parameters for secured delivery of the communication packet;
   updating the cache table entry associated with the index with the negotiated security parameters.

8. A computer-readable medium as in claim 1, wherein the security data stored in the cache table entry include an exempt filter.

9. A computer-readable medium as in claim 8, wherein the step of applying security measures includes allowing the communication packet to pass when the exempt filter is of a bypass type and dropping the communication packet when the exempt filter is of a block type.

10. A computer-readable medium as in claim 1, wherein the security data of the cache table entry include a security parameter record containing security parameters for secured delivery of a communication packet.

11. A computer-readable medium as in claim 10, wherein the security data of the cache table entry includes multiple security parameter records.

12. A computer-readable medium as in claim 1, wherein the cache table entry includes data indicating whether the security data include an exempt filter or a security parameter record.

13. A computer-readable medium having stored thereon a data structure, comprising a plurality of entries forming a cache table, each of the entries having a first data field containing communication stream data identifying a network communication stream and a second data field containing security data identifying security measures to be applied to packets in said communication stream, said each entry having a storage location index derived by combining the communication steam data into a number and calculating a modulus of said number based on a size of a cache table.

14. A computer-readable medium as in claim 13, wherein the communication stream data include a source address and a destination address of the communication stream.

15. A computer-readable medium as in claim 14, wherein the security data include security parameter data representing security parameters for secured delivery of packets of the communication stream identified by the communication steam data.

16. A computer-readable medium as in claim 15, wherein the security data include a Security Association ("SA") under the IPSec protocols.

17. A computer-readable medium as in claim 13, wherein the security data include an exempt filter.

18. A method of applying security measures to communication packets, comprising:
   receiving a communication packet having communication stream data identifying a communication stream to which the communication packet belongs;
   deriving an index from the communication stream data of the packet by combining the communication steam data into a number and calculating a modulus of said number based on a size of a cache table;
   retrieving from a cache table an entry corresponding to said index, the entry containing communication steam data and security data for said communication stream;
   comparing the communication stream data of the retrieved cache table entry with the communication stream data of the communication packet to determine whether a match between the cache table entry and the communication packet is found; and
   when a match is found, applying security measures to the communication packet according to the security data in the cache table entry.

19. A method as in claim 18, wherein the security data includes a Security Association ("SA") under the IPSec protocols.

20. A method as in claim 18, further including the steps of:

when a match between the cache table entry and the communication packet is not found, traversing a list of security policy filters to find a security policy filter matching the communication packet;

reviewing a plurality of security parameter records associated with the matching security policy filter to identify a security parameter record matching the communication packet;

performing security operations on the communication packet according to data in the matching security parameter record for secured delivery of the communication packet; and updating the cache table entry associated with the index with data in the matching security parameter record.

\* \* \* \* \*